United States Patent
Kirk et al.

(10) Patent No.: US 12,035,696 B2
(45) Date of Patent: *Jul. 16, 2024

(54) PET BOWL WITH AUTOMATIC LID

(71) Applicant: Pet Mate Limited, Surrey (GB)

(72) Inventors: Christopher Peter Kirk, Surrey (GB); Jeremy Oates, Twickenham (GB)

(73) Assignee: Pet Mate Limited, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,445

(22) Filed: Nov. 16, 2022

(65) Prior Publication Data

US 2023/0073625 A1     Mar. 9, 2023

Related U.S. Application Data (63) Continuation of application No. 16/698,067, filed on Nov. 27, 2019, now Pat. No. 11,503,801.

(51) Int. Cl.
*A01K 5/02* (2006.01)
(52) U.S. Cl.
CPC ................ *A01K 5/0291* (2013.01)
(58) Field of Classification Search
CPC ... A01K 5/0114; A01K 5/0291; A01K 5/0225
See application file for complete search history.

(56) References Cited

U.S. PATENT DOCUMENTS

| | | | |
|---|---|---|---|
| 1,590,015 A | 6/1926 | Gardner | |
| 3,330,256 A | 7/1967 | De Vaux | |
| 3,532,075 A | 10/1970 | Cooper | |
| 3,646,912 A | 3/1972 | Gardner | |
| 3,720,186 A | 3/1973 | O'Rourke | |
| 4,185,588 A | 1/1980 | Harris | |
| 4,644,903 A | 2/1987 | Shaver | |
| 4,800,845 A | 1/1989 | Budd | |
| D312,334 S * | 11/1990 | Kirk | D30/122 |
| 5,265,560 A | 11/1993 | Dobbins | |
| 9,403,627 B1 * | 8/2016 | Scott | B65D 5/6673 |
| 2002/0178555 A1 * | 12/2002 | Tsai | B65D 45/00 24/572.1 |

(Continued)

FOREIGN PATENT DOCUMENTS

| | | | |
|---|---|---|---|
| CA | 2170688 A1 | 9/1996 | |
| EP | 1671889 A1 * | 6/2006 | B65D 5/643 |

(Continued)

OTHER PUBLICATIONS

Intellectual Property Office (United Kingdom) Combined Search and Examination Report for Application No. GB1819469.6 Completed: May 23, 2019 Mailing Date: May 24, 2019 (pp. 6).

*Primary Examiner* — Ebony E Evans
(74) *Attorney, Agent, or Firm* — Murtha Cullina LLP (57) ABSTRACT

An automatic animal feeder has two bowls and a base unit which accepts the bowls. Two lids are provided, one for each bowl, which may be closed to cover the bowl and prevent access to it or opened about a hinge means to allow access to the bowl. A lid control mechanism is capable of keeping either lid closed independently or opening either lid independently. A removable joining member is provided that links the two lids so that one lid cannot open unless the other lid can also open.

4 Claims, 7 Drawing Sheets

(56) References Cited

U.S. PATENT DOCUMENTS

| | | | | |
|---|---|---|---|---|
| 2008/0105205 A1* | 5/2008 | Goehring | ............ | A01K 5/0114 |
| | | | | 119/51.02 |
| 2015/0344201 A1* | 12/2015 | Weber | .................... | B65D 45/00 |
| | | | | 229/125.36 |
| 2016/0192619 A1 | 7/2016 | Gibbs | | |

FOREIGN PATENT DOCUMENTS

| | | | | | |
|---|---|---|---|---|---|
| GB | 2120071 | A | | 11/1983 | |
| GB | 2183984 | A | | 6/1987 | |
| GB | 2337447 | A | | 11/1999 | |
| GB | 2423913 | A | * | 9/2006 | ........... A01K 5/0291 |
| GB | 2579377 | A | * | 6/2020 | ........... A01K 5/0114 |
| JP | 6370506 | B1 | * | 8/2018 | ............... B26B 3/08 |
| WO | WO-2016000081 | A1 | * | 1/2016 | ........... A01K 11/006 |

\* cited by examiner

SECTION D4-D4
SCALE 2:1

Fig. 5

SECTION D3-D3
SCALE 2:1

PET BOWL WITH AUTOMATIC LID

FIELD OF THE INVENTION

The present specification relates to an automatic pet feeder, that is, a pet feeder where pet food is released to one or more pets at predetermined times.

BACKGROUND OF THE INVENTION

A known type of automatic cat feeder comprises two bowls, each covered by a lid, where each lid is controlled by a timer. The user places cat food in each bowl, and sets each timer for when a cat is to be fed. When each timer determines that the set time has elapsed, the lid controlled by that timer is released, so that the cat may eat the cat food; in this way, the user can ensure in advance that a cat will be fed at pre-determined times. This is particularly useful if the user is not going to be present to feed the cat for period.

These feeders typically feature removable bowls, so they can be washed easily. Although the lid covers the bowl, and cannot be completely lifted until the timer releases the lid, there can be some play in the lid release, and some cats are able to lift the lid slightly, and then repeatedly pull on the bowl so that it is gradually extracted from the gap between the lid and the feeder. The cat can then eat the cat food before the time the user has set the cat feeder to open.

Cat feeders having two bowls, two timers and two lids may be used in at least two ways; firstly, to feed one cat two separate meals, and secondly to feed two cats a single meal. When feeding two cats from the same feeder, it is usually recommended that the user sets both lids to open at the same time. This is because one cat may be more assertive than the other, and if the meals are presented at different times, the more assertive cat will eat both, while the less assertive cat will not be fed.

However, even when the user tries to set both timers to open at the same time, the resolution and accuracy of the timers usually means that one lid will open minutes before the other, allowing one cat access to the bowl before the other.

SUMMARY OF THE INVENTION

One object of the present invention is to make removal of a bowl from the feeder by a pet more difficult.

Another object of the present invention is to allow both lids of a two-lid feeder to open simultaneously.

It should be noted that although the two aspects, and the objects they address, interact advantageously, they can be implemented separately.

According to the present disclosure, there is provided an automatic animal feeder comprising: two bowls; a base unit which accepts the bowls; two lids, one for each bowl, which may be closed to cover the bowl and prevent access to it, or opened about a hinge means to allow access to the bowl; a lid control mechanism, capable of keeping either lid closed independently, or opening either lid independently; and a removable joining member that, when present, links the two lids so that neither lid can open unless the other lid can also open.

Preferred embodiments have one or more of the following features: The joining member interengages with edge portions of the two lids. The lids have locating ribs to constrain the joining member. The joining member attaches to the lids by a snap-fit action.

The term 'front' is used to refer to the side of the base, bowls and lids further from the dial and timer mechanism, while the term 'rear' refers to the to the side of the base, bowls and lids bearing the dial and timer mechanism; cognate terms such as 'forwards' and 'rearwards' are to be interpreted in accordance with this.

An embodiment of automatic animal feeder is described below, by way of example only, with reference to feeding cats, as cats are particularly adept at circumventing automatic feeders in order to access their food prematurely; however, it will of course be realized that the same measures can be applied to feeders for other pets and other animals.

The invention will now be described, by way of example, with reference to the drawings.

DETAILED DESCRIPTION OF THE INVENTION

Figure 1:
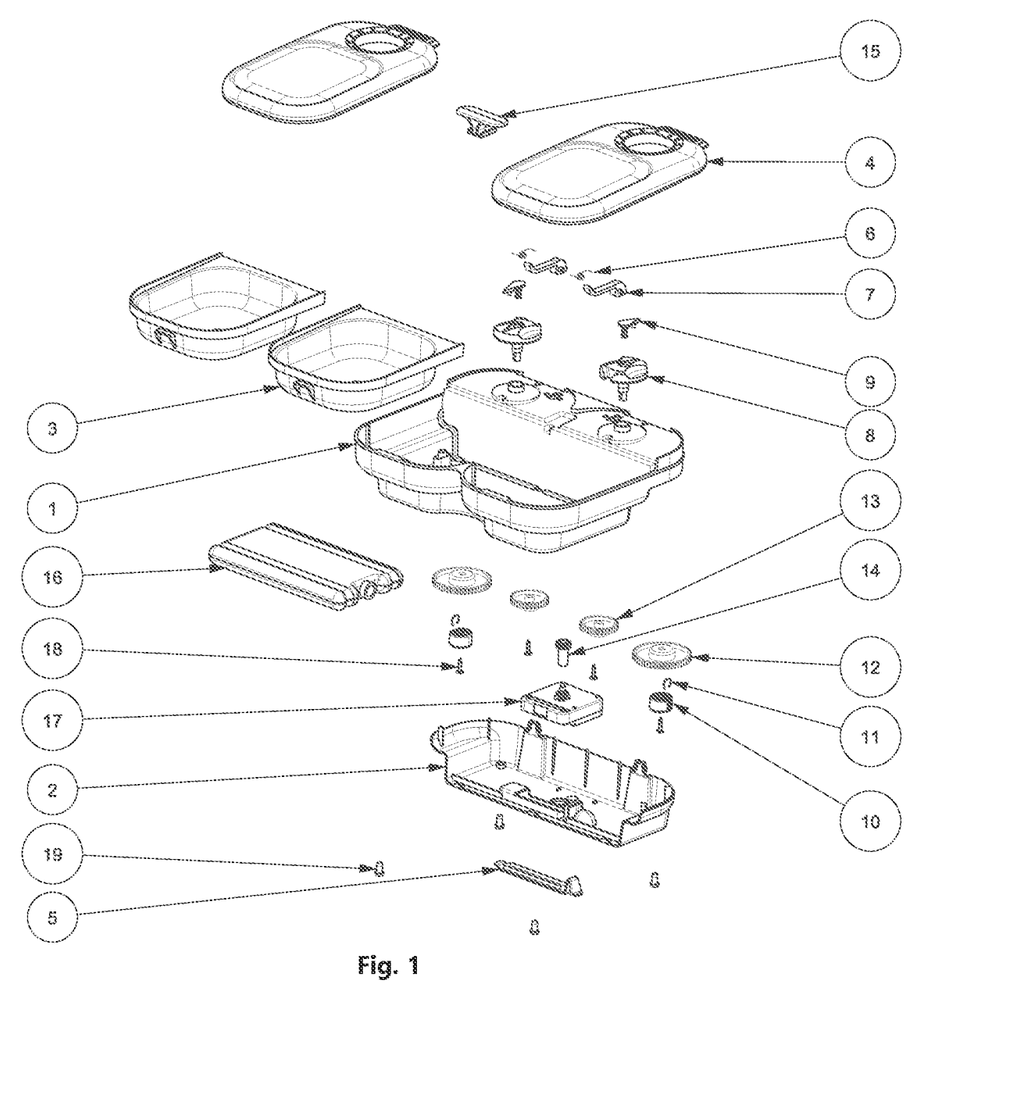
FIG. 1 is an exploded perspective view of an embodiment of the animal feeder.
Figure 2:
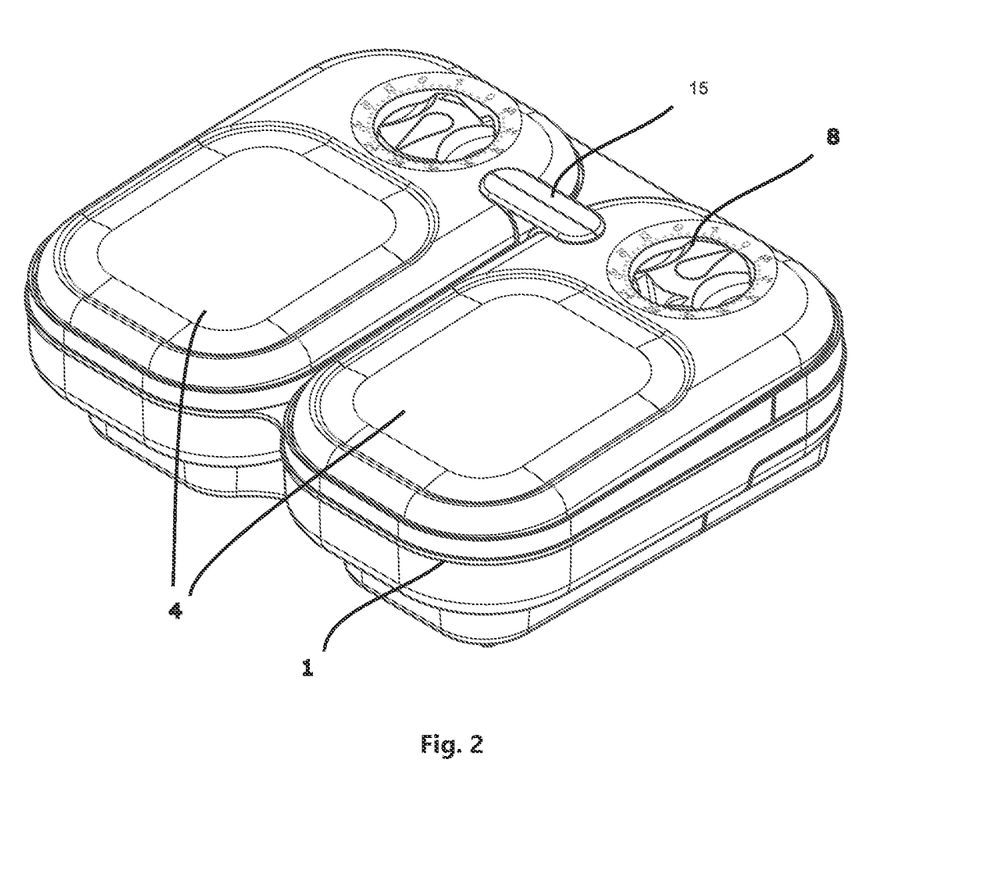
FIG. 2 is a perspective view of the assembled animal feeder of FIG. 1 with the joining element fitted.

Referring to FIG. 1, the animal feeder (in this case, a cat feeder) includes a base 1 shaped to accept two bowls 3 and optionally an ice pack 16 beneath the bowls 3. Two lids 4 are joined to the base in a hinged manner. Two lid levers 7, respectively controlled by two lid springs 6 urge the lids from a closed position to an open position in under the control of a timer mechanism. The assembled product is shown in FIG. 2.

The timer mechanism is driven by a quartz movement 17 and common pinion 14, powered by a battery (not shown), and is covered by mechanism cover 2 and battery cover 5. The common pinion drives two adjacent dial mechanisms; one dial mechanism will be described, the adjacent dial mechanism operates in the same manner. The common pinion 14 drives a mid-gear 13 by means of engaging teeth; the mid gear 13 in turn drives a toothed clutch gear 12.

Figure 3:
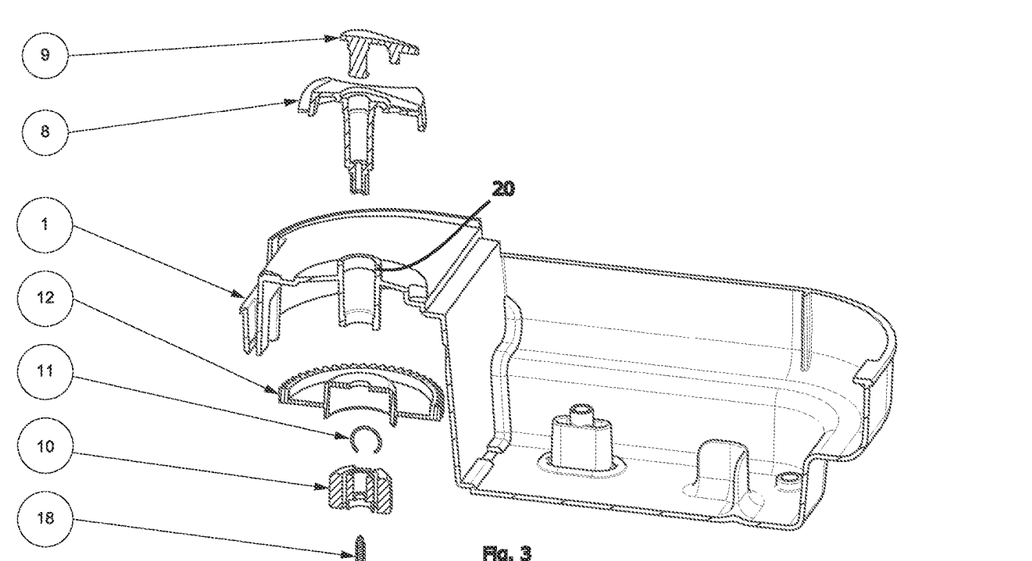
FIG. 3 is a perspective view of part of the animal feeder of FIG. 1.

Referring also to FIG. 3, a dial 8 has a central axle, and sits in a bushing 20 provided on the upper surface of the base 1. The central axle of the dial 8 has a central bore, which is closed at the upper end by a dial cap 9.

Figures 4, 5:
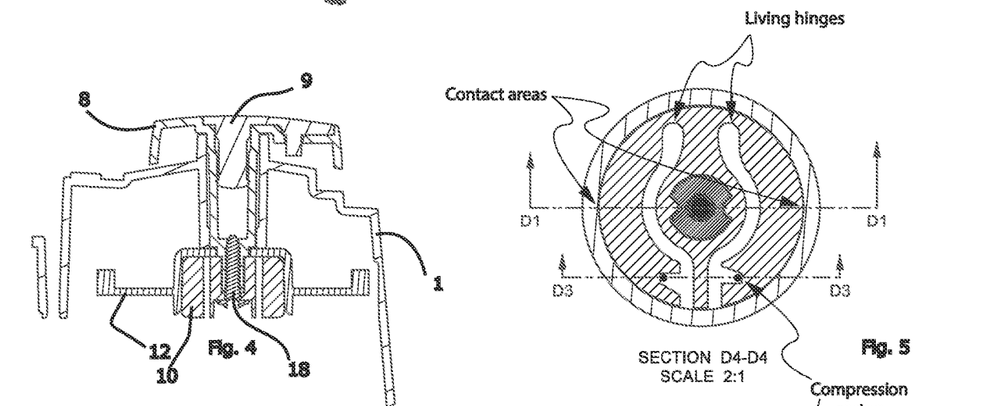
FIG. 4 is a sectional view of part of the animal feeder of FIG. 1.
FIG. 5 is a sectional view of part of the animal feeder of FIG. 1.
Figure 6:
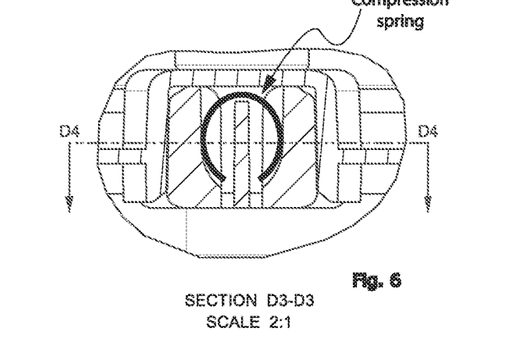
FIG. 6 is a sectional view of part of the animal feeder of FIG. 1.

The clutch gear 12 includes a retaining cavity for a dial clutch 10 and clutch spring 11. As shown in FIG. 4, when the dial 8, dial cap 9, dial clutch 10 and clutch spring 11, are assembled on the base 1, a lower portion of the dial 8 extends through central bores of the dial clutch 10 and clutch gear 12, so that the parts may be held together with a screw flange head 18, which has a thread which engages with the dial 8, and a flanged surface which engages with the dial clutch 10.

The quartz movement 17 rotates the dial mechanism at a constant and predictable rotational speed, so that the dial undergoes a complete rotation in 48 hours (though of course this could be an arbitrary time period). The lid 4 includes an aperture 23 (shown in FIG. 7) for the dial 8; the aperture 23 is circular and has a slightly larger diameter than the circumference of the dial 8, which is also circular. However, the dial 8 includes a slot 21 (shown for example in FIG. 7), while the aperture 23 in the lid 4 includes a corresponding slot projection 22. This slot projection 22 fits under the dial 8 but prevents the dial 8 from passing through the aperture 23 unless the slot 21 and slot projection 22 are aligned. Thus, the lid 4 may only be opened once during a 48-hour period.

The user may set the timer mechanism by aligning the dial cap 9 with subdivisions printed on the lid, where the subdivisions correspond to the proportion of the total 48 hour time period remaining before the quartz movement 17 rotates the dial mechanism and in particular the dial 8 so that the slot 21 and slot projection 22 are aligned so that the dial 8 no longer constrains the lid from opening.

Figure 7:
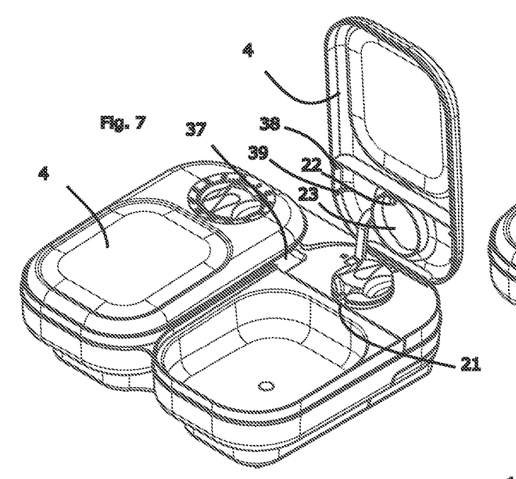
FIG. 7 is a perspective view of the animal feeder of FIG. 1 with a lid open.
Figure 8:
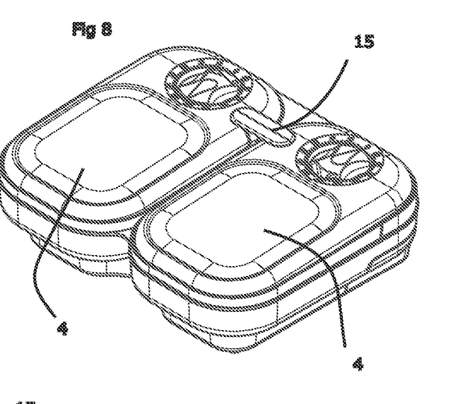
FIG. 8 is a perspective view of the animal feeder of FIG. 1 with both lids closed and a joining element fitted.
Figure 9:
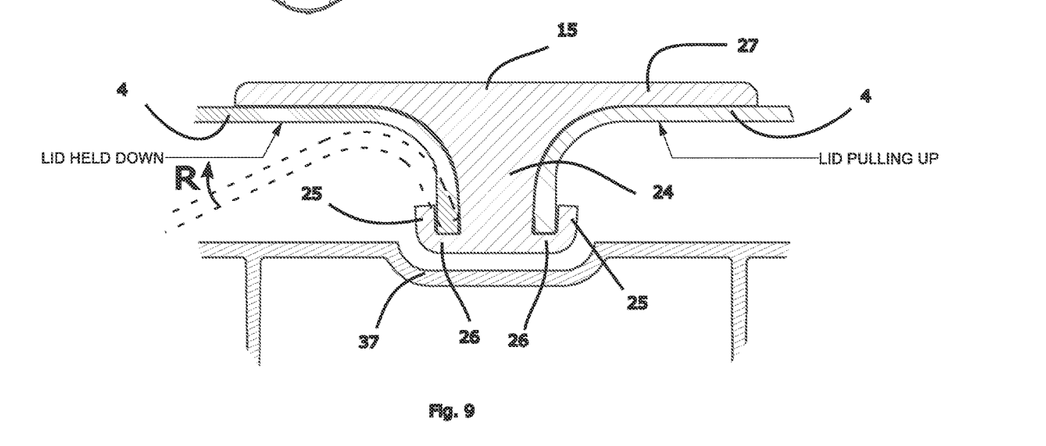
FIG. 9 is a sectional view of part of the animal feeder of FIG. 1.

Referring to both FIG. 1 and FIG. 7, each lid 4 has a substantially flat upper surface, and vertical side walls, the sidewalls meeting the upper surface in a smoothly curved manner. Referring to FIGS. 8 and 9, a lid sync clip 15 has a fastener beam 27, with a shaped stem 24 depending from the fastener beam 27, the stem 24 terminating at its lower end with a profile having a groove 26 and lip 25 on each side. The lid sync clip 15 is fitted by removing lids 4 and rolling into position as indicated by arrow R in FIG. 9 to allow the two adjacent lids 4 attached to the lid sync clip 15 so that the lower edge of each lid 4 engages with the respective groove 26 and lip 25. The stem 24 and fastener beam 27 are shaped so that when the two lids are engaged with the lid sync clip 15, their movement relative to the lid sync clip 15 is constrained with the aid of ribs 38, 39 shown in FIG. 7. Thus, when both lids 4 are engaged with the lid sync clip 15, the movement of either lid is constrained by the movement of the other.

Figure 16:
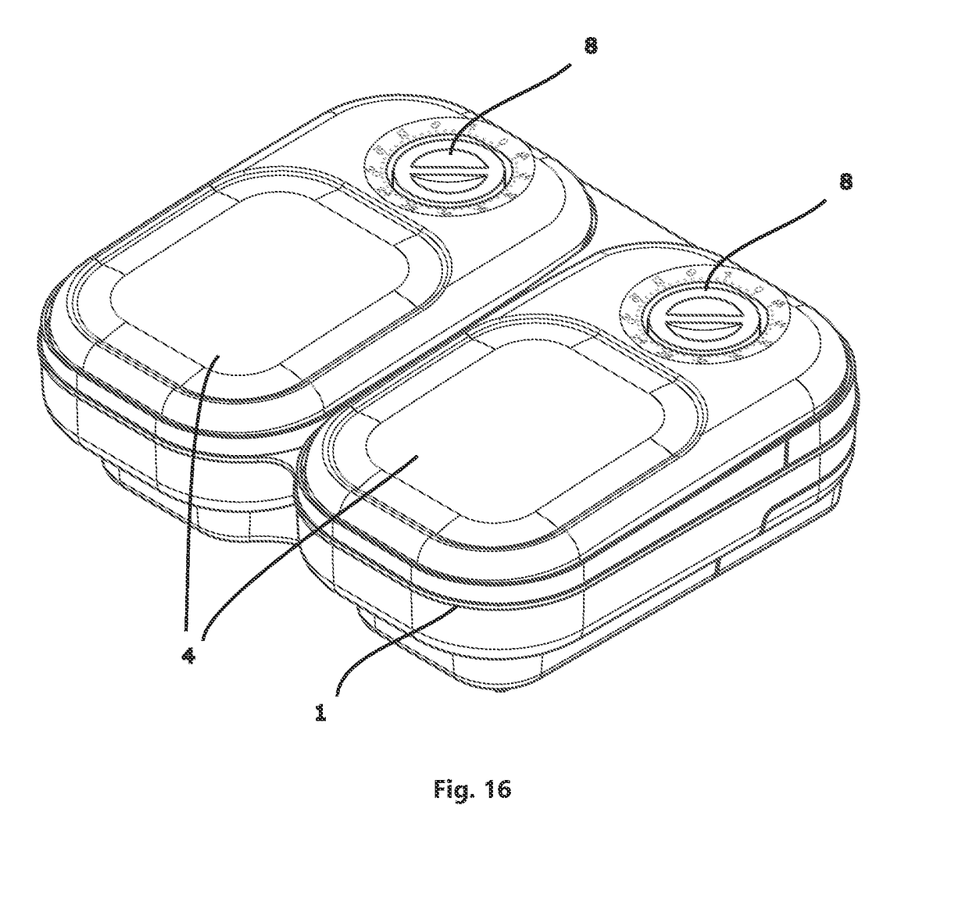
FIG. 16 is a perspective view of the assembled animal feeder of FIG. 1 without the joining element fitted.

Referring to FIG. 16, in one mode of operation, a user may set each dial mechanism independently, for example the first lid may be released to open after 24 hours, and the second lid may be released to open after 48 hours. In this mode, the lid sync clip 15 is not employed.

In a second mode of operation, a user sets each dial mechanism to the same value, so that the first dial 8 will release the first lid and the second dial 8 second lid will release the second lid at almost the same time. In this mode, the user attaches the lid sync clip 15 between the first and second lids 4. Considering the case when the first dial releases the first lid slightly before the second dial releases the second lid, the first lid will not open until the second dial has released the second lid, as the first lid is constrained by the second lid. In the case of the second dial releasing the second lid before the first dial has released the first lid, the second lid will similarly be constrained by the first lid. Therefore, no matter which lid opens before the other, use of the lid sync clip 15 ensures that both lids open at precisely the same time.

The slot 21 of each dial mechanism must be sufficiently large (i.e., subtend a sufficient angle) so that the slot projection 22 is allowed to pass through within a time range greater than the time difference caused error between the two dials when they are set to open at the same time.

The base 1 and the bowl 3 contain projections to ensure that a cat extract one of the bowls 3 from the feeder through a gap between the base 1 and the lids 4. Each bowl 3 has such a projection, and the base 1 has corresponding projections for each bowl; the projection of one bowl and the base will be described, the adjacent bowl features the same projections which act in the same manner.

Figure 10:
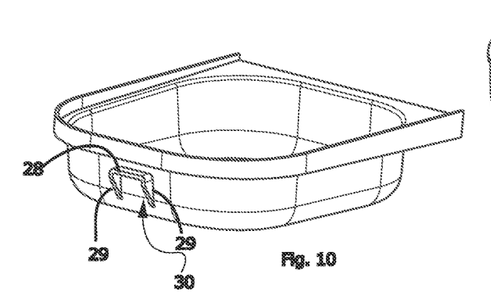
FIG. 10 is a perspective view of the bowl of the animal feeder of FIG. 1.

Referring to FIG. 10, the front side wall of the bowl 3 features a shaped bowl projection 30, which comprises a top ridge 28 and two side ridges 29 which project forwards. The inside of the base 1 features a similar base projection 31, which features a base top ridge 32 and two base side ridges 33, projecting backwards.

Figure 11:
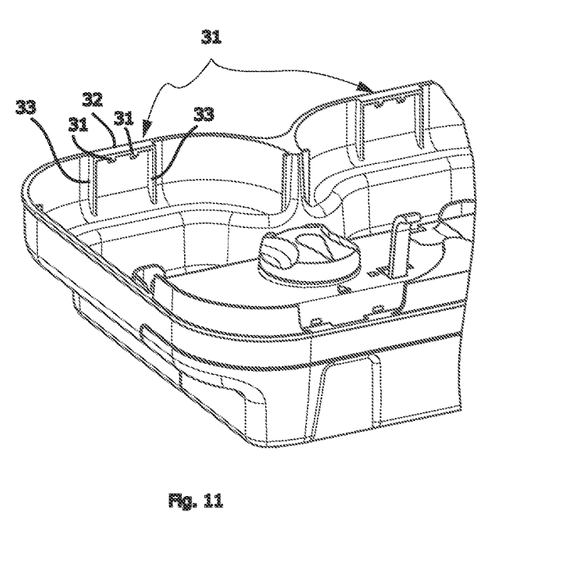
FIG. 11 is a perspective view of the animal feeder of FIG. 1 the bowls and lids removed.
Figure 12:
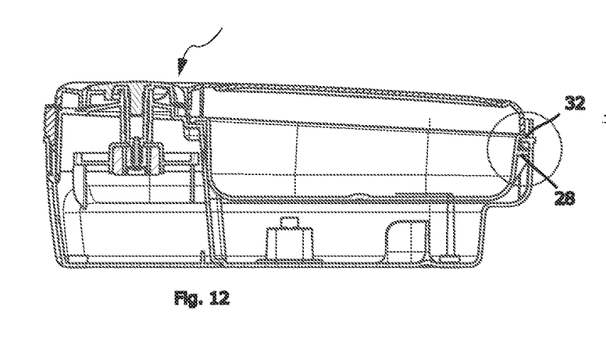
FIG. 12 is a sectional view of part of the animal feeder of FIG. 1.
Figure 13:
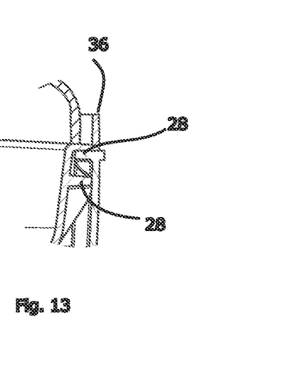
FIG. 13 is a sectional view of a detail of FIG. 12.
Figure 14:
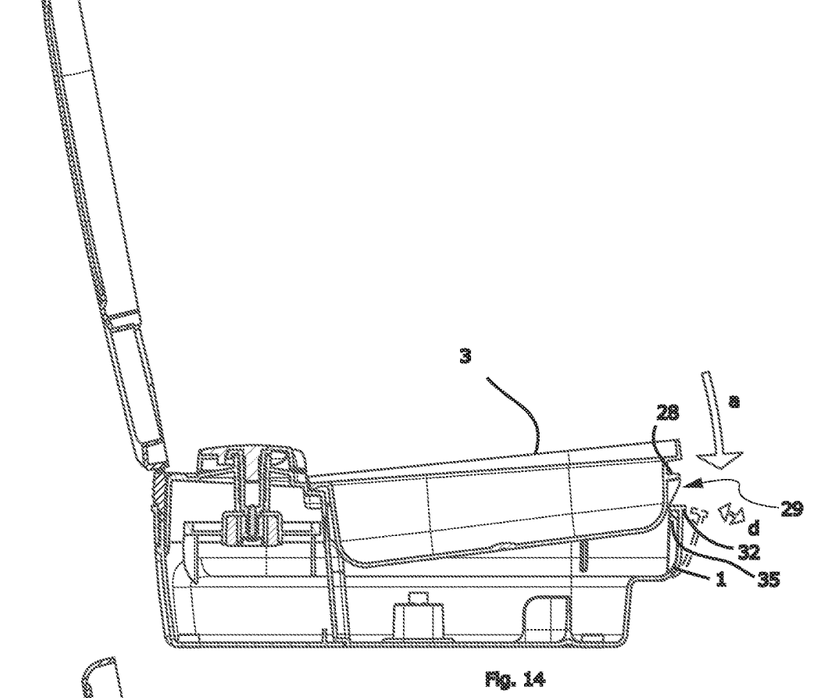
FIGS. 14 and 15 are sectionals of the animal feeder of FIG. 1 showing the insertion and removal of a bowl.

Referring to FIGS. 10 and 11, when the bowl 3 is positioned in the base 1, the bowl's top ridge 28 fits somewhat underneath base top ridge 32, while the bowl's two side ridges 29 fit between the base side ridges 33. Referring to FIG. 14, the bowl side ridges 29 have angled edges, so that when the front of the bowl 3 can be pushed downwards as indicated by arrow a, to deform the front of the base 1 (as indicated by the dotted outline and arrow d) when the rear of the bowl abuts the base 1, until the bowl top ridge 28 clears the base lugs 31 and the bowl positions itself in a 'snap-fit' manner. The base top ridge 32 includes two curved lugs 31, which also aid the smooth removal of the bowl whilst ensuring that the front of the bowl is firmly held down. Referring to FIGS. 12 and 13 when the lid 4 is in the closed position, the bowl top ridge 28 is constrained from moving upwards by the lugs 31, while the base side ridges 33 constrain the bowl side ridges 29, preventing side to side movement of the bowl. Thus, even if a cat can raise the front of the lid, the cat is unable to move the bowl upwards to edge it out of the base 1.

Figure 15:
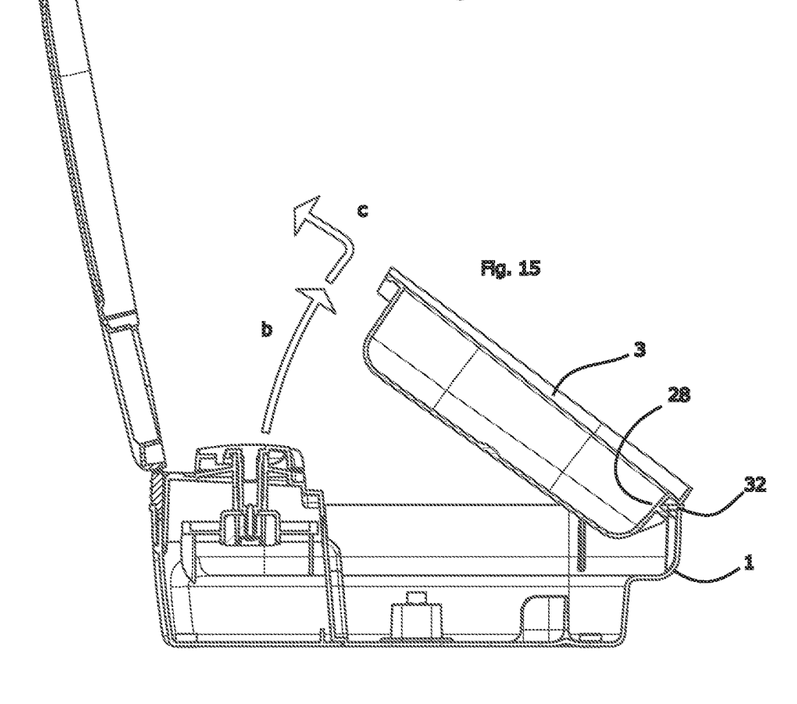

Referring to FIG. 15, when the lid 4 is in the open position, the bowl 3 may be removed from the base 1 by raising the rear of the bowl and tilting it, before drawing it backwards, as indicated by arrows b and c, so that the bowl projection 30 is drawn back from the base projection 31 and the bowl is no longer constrained. The bowl may also be inserted by reversing this method (as an alternative to the snap-fit method described above).

Referring to FIGS. 12 and 13, the base 1 may also include an upward lip 36 that shields the abutment region between the lid 4 and the base 1 to further ensure that a cat cannot introduce its claws between the lid 4 and base 1 to pry the lid open.

What is claimed is:

1. An automatic animal feeder comprising:
   two bowls;
   a base unit which accepts the bowls;
   two lids, one for each bowl, each of the two lids having a closed position in which it covers one of the two bowls and prevents access to it, and each of the two lids configured to be opened about a hinge to allow access to one of the two bowls;
   a lid control mechanism configured to keep either lid closed independently, or opening either lid independently; and a removable joining member that, when present, links the two lids so that neither lid can open unless the other lid can also open.

2. The automatic animal feeder according to claim 1, wherein each of the two lids includes an edge portion, and the removable joining member engages with the edge portions of the two lids.

3. The automatic animal feeder according to claim 1, wherein the two lids have locating ribs to constrain the removable joining member.

4. The automatic animal feeder according to claim 1, wherein the removable joining member attaches to the two lids by a snap-fit action.

\* \* \* \* \*